(12) United States Patent
Steinich et al.

(10) Patent No.: US 7,808,231 B2
(45) Date of Patent: *Oct. 5, 2010

(54) SENSOR ACCORDING TO THE RUNTIME PRINCIPLE WITH A DETECTOR UNIT FOR MECHANICAL-ELASTIC WAVES

(75) Inventors: Klaus Manfred Steinich, Zorneding (DE); Liu Jigou, Erding (DE)

(73) Assignee: ASM Automation Sensorik Messtechnik GmbH, Moosinning (DE)

( * ) Notice: Subject to any disclaimer, the term of this patent is extended or adjusted under 35 U.S.C. 154(b) by 948 days.

This patent is subject to a terminal disclaimer.

(21) Appl. No.: 11/047,430

(22) PCT Filed: Jul. 25, 2003

(86) PCT No.: PCT/EP03/08195

§ 371 (c)(1),
(2), (4) Date: May 20, 2005

(87) PCT Pub. No.: WO2004/013577

PCT Pub. Date: Feb. 12, 2004

(65) Prior Publication Data

US 2005/0200353 A1  Sep. 15, 2005

(30) Foreign Application Priority Data

Jul. 31, 2002 (DE) .................. 102 34 960

(51) Int. Cl.
*G01B 7/14* (2006.01)
*G01R 33/038* (2006.01)

(52) U.S. Cl. .............. 324/207.13; 324/207.24

(58) Field of Classification Search ........... 324/207.13, 324/207.24
See application file for complete search history.

(56) References Cited

U.S. PATENT DOCUMENTS

| 2,511,178 | A |   | 2/1944  | Roters ............... 73/862.333 |
| 5,590,091 | A |   | 12/1996 | Gloden et al. ............ 367/140 |
| 5,680,041 | A | * | 10/1997 | Begin ................. 324/207.13 |
| 5,736,855 | A |   | 4/1998  | Smith et al. ........... 324/207.13 |
| 5,986,449 | A | * | 11/1999 | Koski ................ 324/207.13 |
| 6,441,608 | B2| * | 8/2002  | Brunsch et al. ....... 324/207.13 |
| 6,707,290 | B2| * | 3/2004  | Nyce et al. ............ 324/207.13 |
| 2005/0132807 | A1 | * | 6/2005 | Steinich ................. 73/570 |
| 2007/0188162 | A1 | * | 8/2007 | Steinich .............. 324/207.11 |

FOREIGN PATENT DOCUMENTS

| DE | 28 33 369   | 7/1978  |
| WO | WO96/35923  | 11/1996 |

* cited by examiner

*Primary Examiner*—Reena Aurora
(74) *Attorney, Agent, or Firm*—Head, Johnson & Kachigian

(57) ABSTRACT

A detector unit apparatus and method for operating and producing a detector unit to be adapted to varying environmental influences or to its own, in particular mechanical, electrical or magnetic parameters of the detector unit, which are dependent on measuring lengths. An inventive positional sensor operating according to the running time principle of a mechanically elastic shaft and comprising a waveguide, a positional element, e.g. a positional magnet, which can be displaced in particular along the waveguide, in addition to a detector assembly that is located on the waveguide and comprises a detector coil wherein the detector assembly has a current source so that a current can flow through the detector coil.

11 Claims, 13 Drawing Sheets

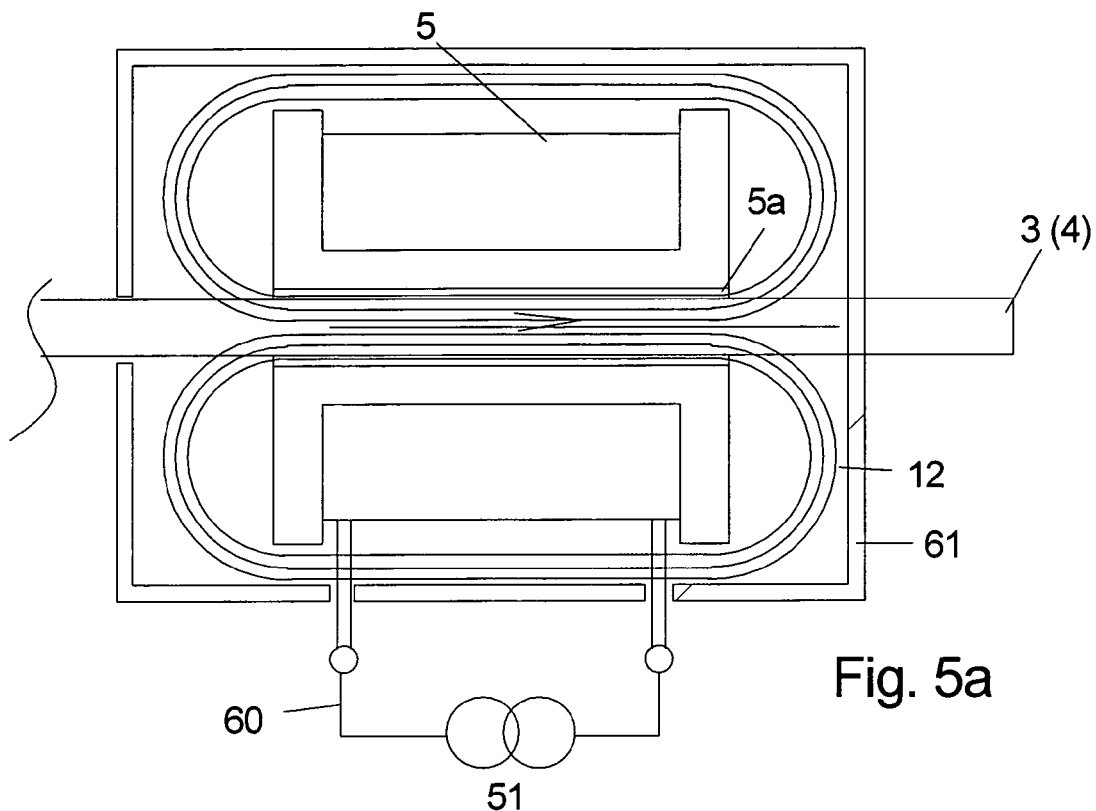
Fig. 5a
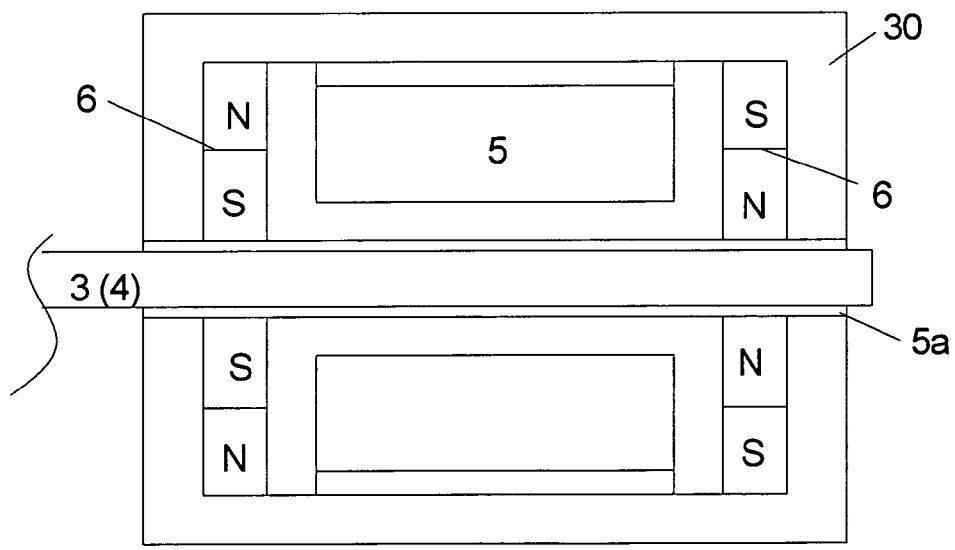
Fig. 5b1

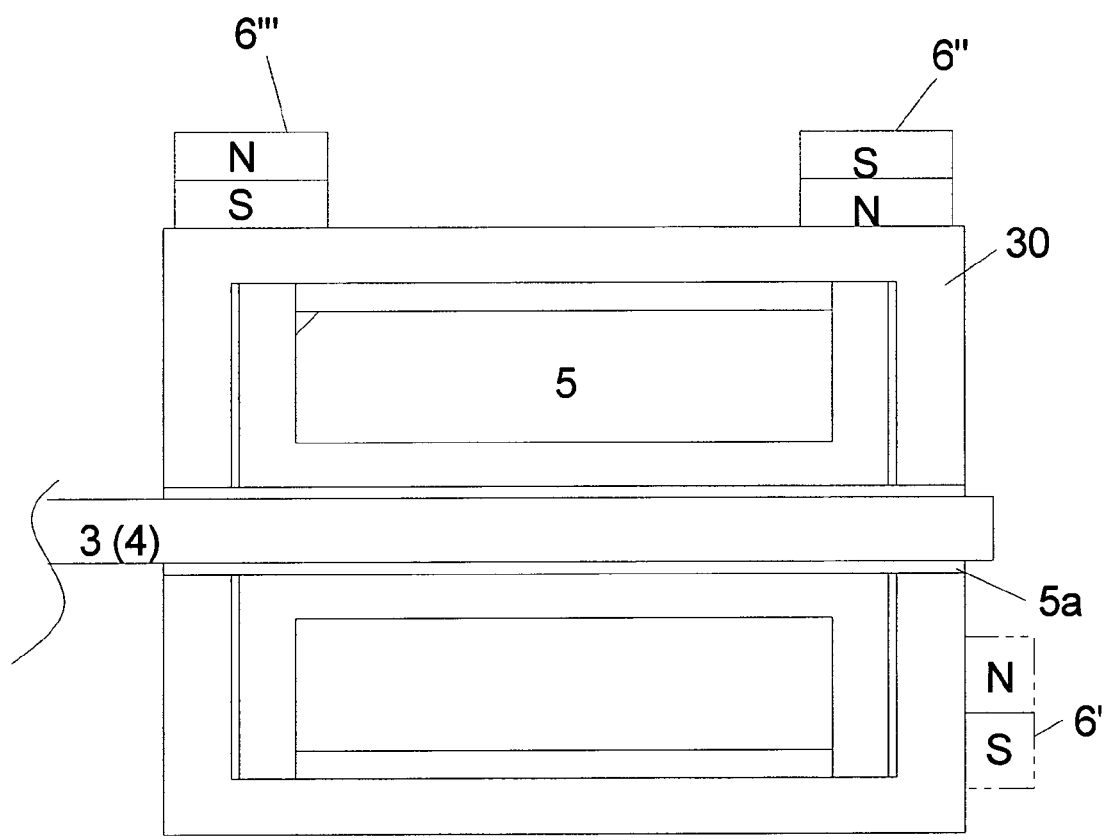
Fig. 5b2

SENSOR ACCORDING TO THE RUNTIME PRINCIPLE WITH A DETECTOR UNIT FOR MECHANICAL-ELASTIC WAVES

CROSS-REFERENCE TO RELATED APPLICATION

This is a National Phase Application in the United States of PCT Application No. EP2003 008195 which claims priority to German Application No. 10234960.6 filed 31 Jul. 2002.

STATEMENT REGARDING FEDERALLY SPONSORED RESEARCH OR DEVELOPMENT

N/A

REFERENCE TO A MICROFICHE APPENDIX

N/A

BACKGROUND OF THE INVENTION

Field Of the Invention

The invention concerns position sensors, in particular their detector unit, based on the principle of the runtime measurement of mechanical-elastic impulses in a waveguide, which include, beside this waveguide, a position element that can move relatively to it and that is generating or detecting the mechanical-elastic wave.

The waveguide usually consists of a pipe, a wire or a strip, and can serve also as an electrical conductor. The waveguide can be arranged further in a form-giving, linear or circular body made of non-magnetic material, e.g. plastic or metal, for the support and bearing of the waveguide.

Based on the Wiedemann effect, a current pulse fed into the waveguide produces, by its overlaying with a laterally on the magnetostrictive waveguide oriented external magnetic field, which is originating from a position element, in particular from a position magnet, generates a torsion impulse of a mechanical elastic wave which spreads out in both directions in the waveguide, with approximately 2,500 m/s-6,000 m/s from the place of generation, that means e. g. the position of the position element—depending upon the elastic modulus or the shear modulus of the used waveguide material.

In a place, usually at an end of the waveguide, the torsion part of this mechanical elastic impulse is sensed in particular by a detector unit, which is located in most cases in a fixed position related to the waveguide. The time duration between the release of the exciting current impulse and the receipt of this mechanical-elastic wave is thereby a measure for the distance of the movable position element, e.g. of the position magnet, from the detector unit or also from the coil and/or electromagnet.

Such a typical sensor is described in the U.S. Pat. No. 5,590,091 as well as U.S. Pat. No. 5,736,855.

The main attention of the present invention is on the detector arrangement. This covers a detector coil, which is either arranged around the waveguide or is arranged as a so-called Villary detector around a Villary strip, which is standing away crosswise, in particular in a 90° angle, from the waveguide and is connected with it in a way, in particular mechanically, e.g. by welding, that the torsion impulse running in the waveguide is transformed in the Villary strip into a longitudinal wave. Such a longitudinal wave compresses respectively stretches the magnetoelastic element, which means the waveguide or the Villary strip, in an elastic way within the crystalline range, and changes therefore its permeability $\mu$. The Villary strip respectively the waveguide consists for this purpose of a material with as high a change of the magnetic permeability $\Delta\mu_r$ as possible e.g. from nickel or a nickel alloy, or from other suitable materials. As a compromise between the looked for characteristics also the so-called constant module alloys have proven with which the temperature coefficient of the E and/or shear modules are influenceable and in particular can be kept constant over wide temperature ranges. Thereby for instance the form of a self-stable strip material is selected with a thickness of approximately 0.05-0.2 mm and a width of 0.5-1.5 mm.

Because $$\Delta U \approx N \times \frac{\Delta \Phi}{\Delta t} \rightarrow \Delta U \approx N \times \frac{\Delta B \times \Delta A}{\Delta t} = N \times \frac{\mu_0 \times \Delta \mu_r}{\Delta t} \times \frac{I \times N}{L}$$

therefore $$\Delta U \approx \frac{\Delta \mu_r}{\Delta t} \times K$$

because the values for $\mu_0$, I, N, L can be considered as being constant.

The mechanical elastic density wave passing through a magnetoelastic element, e.g. the Villary strip, expresses itself thus in a voltage variation $\Delta U$, which can be measured as a useful signal at the detector coil.

As it is evident, the useful signal $\Delta U$ is the larger, the larger the variation of the magnetic permeability $\Delta\mu_r$ results.

Additionally such a range of the curve $\Delta\mu_r(H)$, thus of the magnetic permeability over the magnetic field strength, is desired as operating point or operating range in which the magnetic permeability $\Delta\mu_r$ changes as linear as possible, however as strongly as possible relative to the reason, and therefore it will be tried to configure the function $\Delta\mu_r(H)$ in the rising slope as steeply as possible and to establish the working area there, within the approximately linear range.

In the state of art a so-called bias magnet in form of a permanent magnet is arranged in spatial proximity to the detector coil, e.g. parallel to the Villary strip, to adjust the operating point.

The operating point of the mechanical-elastic detector unit depends, besides from the magnetic parameters of the bias magnet, mainly on its positioning relative to the detector coil.

This is in unfavorable in several respects, for instance with employment of the position sensor in places, which are subjected to mechanical, in particular dynamic mechanical loads or also thermal loads, which change the magnetic parameters of the bias magnet and accelerate in particular its aging process, which entail likewise a change of the magnetic parameters.

Additionally all form deviations from the normal shape, arising with the manufacturing of the bias magnet, are unfavorable in the same way. The same applies to the production-determined dispersions of the magnetic parameters with the manufacturing of the bias magnet.

A further disadvantage consisted in the fact that in case of a too close approach of the position magnet to the detector coil, the operating point is changed negatively. Therefore, with the detector unit in accordance with the state of the art, the waveguide had to be extended over the measuring range, within whose the position magnet could move back and forth, so far that the detector unit with the detector coil was far away enough from the measuring range in order to reduce disturbing influences to a controllable extent. This however always resulted in an overall length of the position sensor, which was clearly larger than its measuring range.

In the following the configuration of the detector unit as a Villary detector and as a coaxial detector unit will be described, without limiting the invention on that, since this is also applicable with a detector coil arranged coaxially around the waveguide. The solution as Villary detector has the advantage of a particularly strong suppression of externally linked, mechanical-acoustic spurious signals in relationship to the useful position signal.

BRIEF SUMMARY OF THE INVENTION

It is therefore the task in accordance with the present invention, to make available a detector unit, in particular a Villary detector respectively a detector coil around the waveguide, as well as a procedure for its operation and manufacturing, which avoids the disadvantages of the state of the art and in particular permits an adaptation of the detector unit to changing environmental influences or to changing own parameters, in particular mechanical, electrical or magnetic, measuring length-dependent parameters of the detector unit.

By subjecting the detector coil with a bias current, a bias magnetic field is produced that is variable at any time.

If the power source is adjustable, the bias magnetic field can be controlled in this way and external influences, aging processes etc. can be compensated and the detector unit can be operated at the desired operating point, preferably within the range of a linear dependence between magnetic permeability and mechanical traction/compression stress.

If additionally or instead of that one or more flux guiding pieces are arranged at the detector coil, then this causes on the one hand a closed magnetic circuit through the coil and on the other hand a shielding against disturbing external magnetic fields, like those who can originate, for example, from the position magnet or also from the magnetic field around the waveguide itself, and the linking of disturbing impulses is substantially reduced. Such influences arise without shielding by a flux guiding body before all if the position magnet approaches the detector unit, so that for this reason, with conventional position sensors, a relatively large dead range must be considered, thus a length range in the proximity of the detector unit, which the position magnet must not enter. This causes a larger overall length of the position sensor in relationship to the desired measuring length and is therefore disadvantageous with many applications.

The flux-guiding piece has also the function to reduce the control current (bias current) to a minimum as well as to increase the signal amplitude.

The magnetic shielding in form of the flux guiding body should thereby consist of a material with an as high magnetic permeability as possible ($\mu_r \gg 1$), in particular at least $\mu_r > 1000$, in order to need a low control current. Alternatively the flux guiding body can be also magnetically hard, in order that even without current flow through the detector coil a residual magnetic field remains by remanence and the flux guiding body acts at least for a limited time as a bias magnet (temporary permanent magnet).

Particularly in cases, in which the flux guiding body respectively the flux guiding bodies do not completely enclose the detector coil and/or if no flux guiding pieces are used, but also as an additional measure, the magnetic shielding can be improved by a shield housing, which encloses the detector coil as tightly as possible including the part of the magnetic-elastic element (waveguide or Villary strip) that is penetrating it. As material for the shield housing the so-called Mu-metal is applicable, which possesses a permeability of $\mu_r > 1000$.

As far as the detector unit has the design of a Villary detector, that is with a Villary strip standing away crosswise from the waveguide, which extends into the detector coil, preferably also out of it again, then the flux guiding body must contain necessarily at least one entrance opening, and also an exit opening for the Villary strip if necessary, and the Villary strip must be movable without mechanical contact in relationship to it. Beyond that at least one conductor opening is necessary in the flux guiding body, in order to be able to insert the electrical conductors supplying the detector coil into the flux guiding body. Preferably this is done not through the openings for the Villary strip, but via a separate conductor opening, which is also in the front face of the usually cylindrical flux guiding bodies, preferably however in their lateral surface.

In order to make possible a simple assembly of the flux guiding body, the flux guiding body consists either of two half-cylindrical shells, completing each other to a cylinder, in which the described openings are located on the contact face of the half shells, or of a pot-shaped cylinder open on a face, and a face closing cover.

Furthermore it is to be made certain that the waveguide, and its surrounding and supporting body if necessary, is located in a defined position to the detector coil, and this relative position is sufficiently strongly immovable, fixed.

The detector unit includes a detector arrangement, in which the detector coil is integrated, and beyond that also a power supply.

The detector coil and the uncoupling impedance can then be interconnected either in a measuring bridge, or in a series circuit, in order to get the desired useful position signal, which afterwards can be preferably processed over a difference amplifier and if necessary, a further bridge circuit. The two coils are preferably realized as two separated coils e.g. on a common spool. Combining into only one common coil is possible.

While the Villary strip consists in all rule of magnetoelastic material, multipart configurations are also possible from a first and a second partial strip, which are connected together, whereby then preferably the first partial strip does consist of non-magnetic and non-magnetoelastic material, the second partial strip, in turn, of magnetoelastic material.

In order to reduce the influence of the detector unit by the exciter impulse as far as possible, the bias current of the detector coil is only connected after the exciter impulse faded away through the waveguide. Afterwards the bias current is either controlled in order that the Villary strip can be operated within the linear range as described above, or in order that the attainable useful position signal becomes optimal, in particular regarding its absolute amplitude and/or in relationship to the strength of the disturbing position signal.

The configuration of the detector coil in form of a toroidal coil, in particular if it is flowed through by current, has proven itself as particularly effective, above all, for the adjustment of the operating point, whereby the central opening of the toroidal inductor is penetrated then by the magnetoelastic element, that is the Villary strip or the waveguide, since thereby a particularly good useful signal is obtained.

Furthermore it has shown that also the detection of the useful signal is possible directly from the waveguide, that is not over a Villary strip standing away crosswise from the waveguide, by means of a detector arrangement, in particular if a reflector is present at one end of the waveguide that reflects the mechanical-elastic wave running along the waveguide, and the detector arrangement—in particular in the proximity to this reflector—is arranged in such a position, where the amplitude of the wave running against the reflector as well as the amplitude of the wave reflected from there overlay amplifying themselves, whereby a doubled amplitude can be obtained in the optimal case.

Thus no Villary strip is needed, whose heat treatment and welding to the waveguide are only with difficulty reproducible.

The position magnet should preferably possess thereby a magnetic field aligned parallel to the waveguide.

In this case a scanning of the useful signal is possible by a detector arrangement, which includes in particular a detector coil, without this detector coil being flowed through permanently by a direct current and/or without an additional bias magnet has to be arranged close to the detector arrangement.

Several concrete embodiments are possible thereby:

The detector coil can be penetrated by the waveguide coaxially in its longitudinal direction, or at least one detector coil, or two diametrically to each other opposite detector coils, if necessary, can be arranged on both sides of the waveguide in same position.

Preferably a flux guiding body is arranged in each case at the coil, whereby the flux guiding body should not get closer to the waveguide than ¼ to ⅛ the wavelength of the waveguide, in order not to worsen the result.

With a detector coil arranged coaxially to the waveguide the flux guiding body can surround the coil outside except the passage for the waveguide, or also can let a front face open, whereby then a shell-shaped partition wall is to be preferred around the waveguide between the waveguide and the interior periphery of the detector coil.

If the detector coil is not penetrated by the waveguide, but it is arranged beside the waveguide, the coil can be arranged with its longitudinal axis parallel to the longitudinal direction of the waveguide or crosswise to it, either with a coil only on a side of the waveguide or with two, in particular identical coils, each other opposite in relationship to the waveguide.

The flux guiding body can be thereby shell-shaped and surround the detector coil in the outside with its longitudinal axis coaxial to the longitudinal axis of the detector coil or it can be arranged in the internal passage of the detector coil.

Particularly with the coil axis extending crosswise to the longitudinal extension of the waveguide, the flux guiding body must not completely enclose the coil on its radial external faces, but an E-shaped flux guiding body, whose central leg penetrates the coil, is likewise well applicable.

BRIEF DESCRIPTION OF THE DRAWINGS

An embodiment in accordance with the invention is described in greater by way of example detail hereinafter, with reference to the Figures. The drawings show:

FIGS. 5(a)-(c): sectional views through various detector arrangements.

BRIEF DESCRIPTION OF THE PREFERRED EMBODIMENTS

Figure 1:
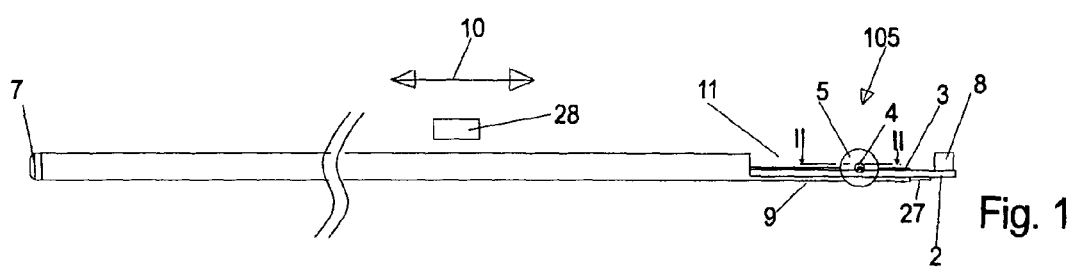
FIG. 1: a plan view on the position sensor.
Figure 2:
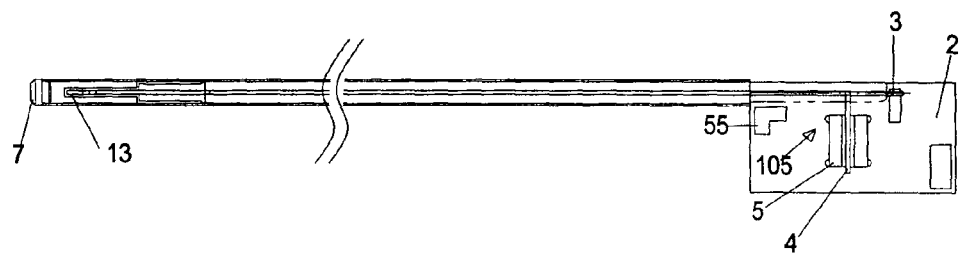
FIG. 2: a side view with partially sectioned coil in accordance with FIG. 1,
FIG. 3: a front view in accordance with FIG. 1,
FIG. 4a, b: the detector coil in a series circuit.

The FIGS. 1 and 2 show a sensor element, in which the supporting body 1 is a tube with a circular cross section and it is represented strongly shortened just like the waveguide 3 running centered therein. In practice these two construction units are very long in the comparison to the diameter, since they must extend over the entire measuring range in the measuring direction 10.

Instead of a straight-lined running waveguide in the supporting body, there might be also a curved, in particular ring-shaped and circularly curved supporting body with a waveguide 3 lying in it, whereby the measuring direction 10 could be no more a straight, but a curved line, for example a circle or an almost complete circle.

The waveguide 3 is held central in the insignificantly larger internal cavity of the supporting body 1 by lengthwise spaced bars or by a constantly existing support, for example by means of one or several tubular pieces with homogeneous or cellular structure, e.g. a foam hose 21, in relationship to the inside diameter of the supporting body 1. An isolated back conductor 22 is arranged e.g. between the outer circumference of this hose 21 and the interior perimeter of the pipe, which can serve also as an electrical back conductor.

At the front end, the left one in the FIGS. 1 and 2, the supporting body 1 can be closely locked by a catch 7, and the waveguide 3 can exhibit a damping element 13 at its free front end in order not to reflect mechanical oscillations arriving there in the waveguide 3, but to absorb them as completely as possible.

However, substantial for the invention is the rear end of the tubular supporting body 1 and of the waveguide is 3 with the connection with a head plate 2 arranged there, without to exist in particular the necessity to accommodate this head plate in any form of mounting plate or housing, as only this housing or the mounting plate is connectable stably with the supporting body 1.

Figure 3:
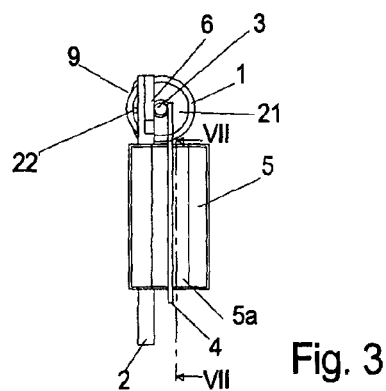

A recess 11 is made for this purpose at the rear end of the supporting bodies 1 over a length, which corresponds maximally to the length of the head plate 2, either—as represented in FIGS. 1, 2 and 3—a parallel is laid shifted inward to a tangent regarding to the cross section of the supporting body 1 and the larger part of the cross section of the supporting body 1 separated thereby is removed. The head plate 2 is for example glued on the remaining smaller part of the cross section, which remains existing then in form of an extension 9.

Since the head plate 2—seen in the measuring direction 10, i. e. in the proceeding direction of the supporting body 1 and the waveguide 3—is substantially broader than the cross section of the supporting body 1, this arrangement of the head plate 2 takes place so that it is protruding only on one side beyond the width of the cross section of the supporting body 1, i. e. it closes in particular on the other side with the outside edge of the supporting body, in particular with the outside edge of the extension 9, as it is best represented in FIG. 3.

The adhesive 14 is located thereby preferably not only between the contact surfaces of the head plate 2 with the extension 9, but also between the head plate 2 and the internal perimeter segment of this extension 9, in order to ensure a safe gluing, and it is reaching preferably also around the edges of the extension 9, a little bit around on the exterior surface of the extension 9.

The FIGS. 4 ff. and 5 show detector circuits in their concrete structure and as alternate circuit diagrams, in which the detector arrangement 105 (including the detector coil 5) of the Villary detector is included.

Figure 4A:
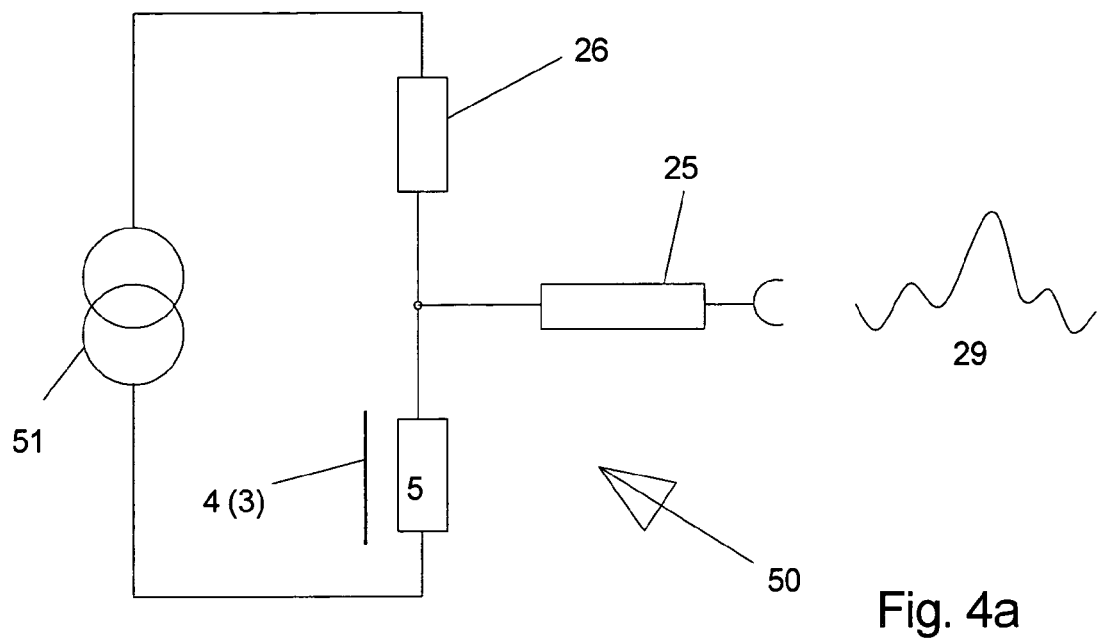
FIG. 4c: the detector coil in a measuring bridge.
FIG. 4d: a difference amplifier for the subsequent processing of the position signal.

FIG. 4a shows the basic structure of the detector circuit 50, which shows the detector arrangement 105 including the detector coil 5 connected in series with an uncoupling impedance 26, which both are supplied together by a power source 51. Between detector coil 5 and uncoupling impedance 26 the pick-up of the useful signal 29 takes place by a coupling impedance 25, e.g. a capacitor.

Figure 4B:
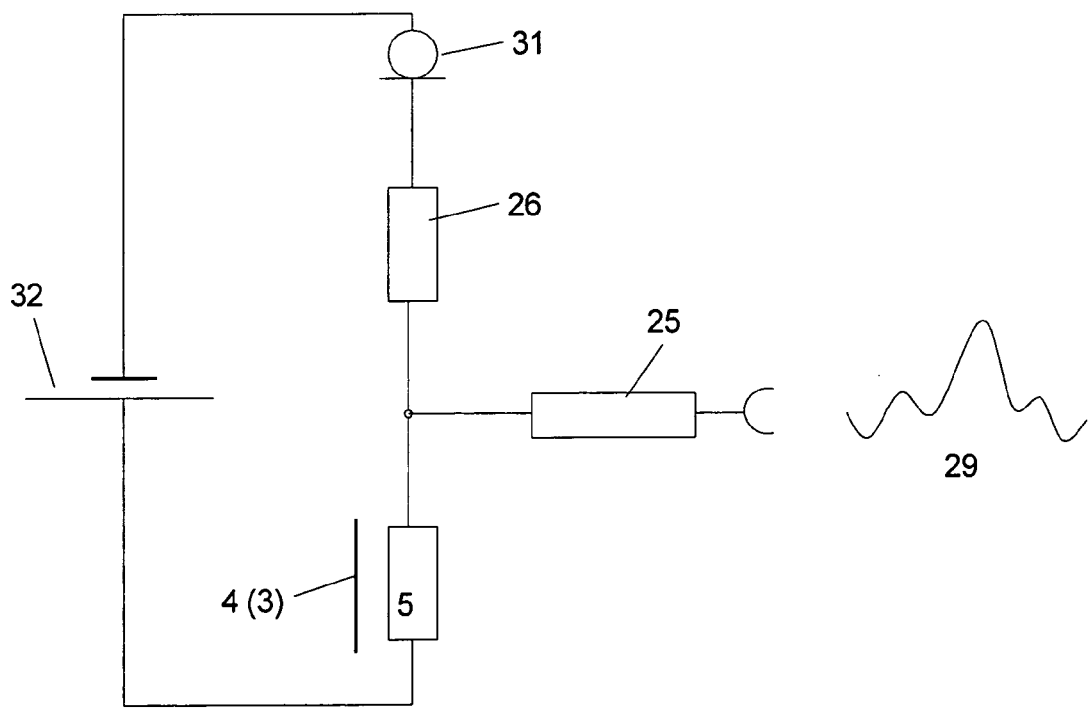

FIG. 4b shows a similar structure, whereby the power source 51 is replaced by a voltage supply 32 and a constant current diode 31 connected in series to it in a circuit with the detector arrangement 105 and the uncoupling impedance 26.

Figure 4C:
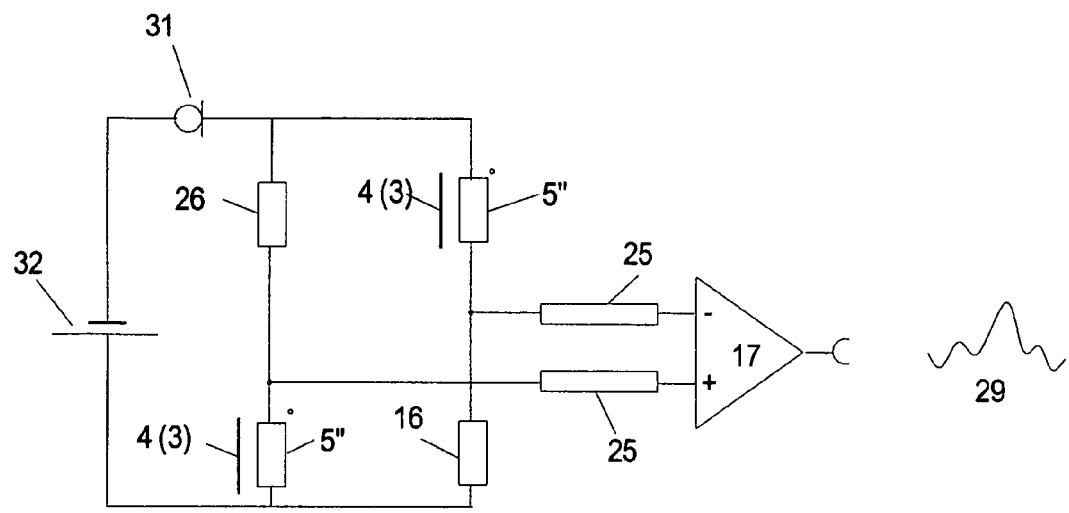

FIG. 4c shows a circuit, in which the detector coil of the detector arrangement is distributed on two detector coils 5'', each of them exhibiting the half of windings and being arranged opposite in two parallel branches with the power source equipped with the voltage supply 32 and the direct current diode 31. Additionally to the respective half detector coil 5'', an uncoupling impedance 26 in one case as well as a bridge completing impedance 16 in the other case is arranged in each of the two parallel branches.

In any of the parallel branches, the pick-up of a signal is done in the center between the two elements and it is supplied over a respective coupling impedance 25 to an amplifier 17, which emits the useful signal 29.

Figure 4D:
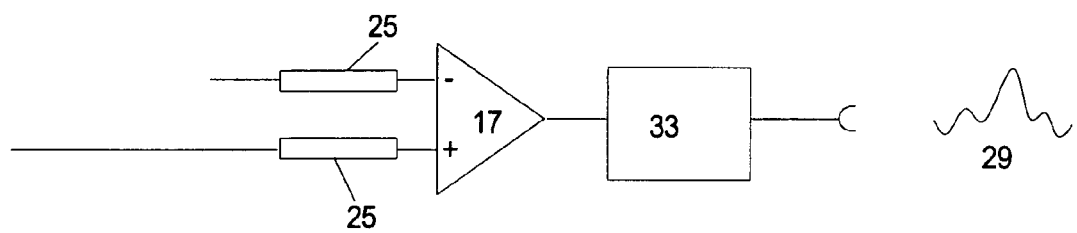

FIG. 4d shows a quadrator 33, which can be inserted for the amplification of the useful signal 29 in all of the previously described cases.

Figure 5C:
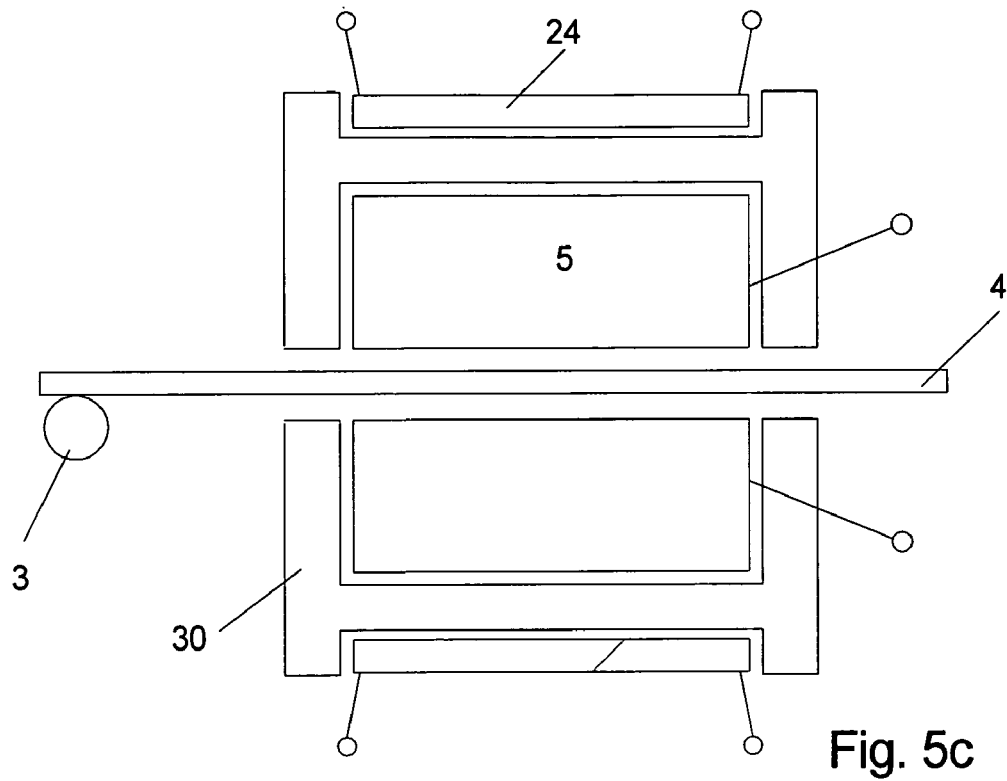
Figure 6:
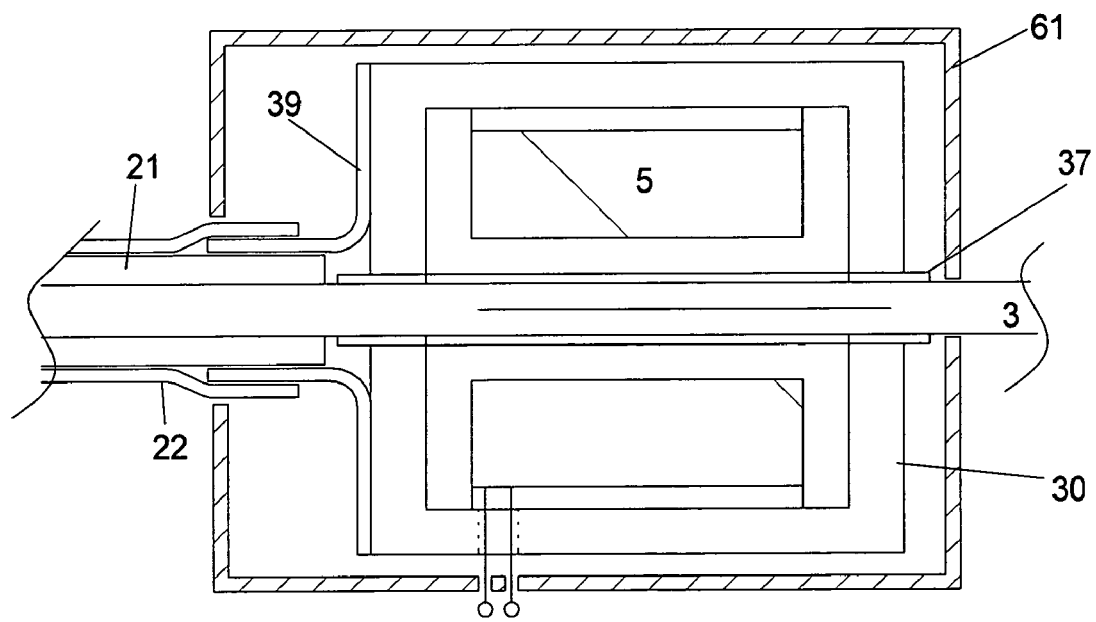
FIG. 6: section views through a detector arrangement on the wave body.

The FIGS. 5-7 show by opposition various structural execution forms in accordance with the invention:

In FIG. 5a the detector coil 5 surrounding the Villary strip 4 (or the waveguide 3) is represented, from whose passage the Villary strip is protruding on both sides. The connection of the Villary strip 4 to the waveguide as well as the further components of the detector arrangement are not represented.

In opposition to the state of the art, in which this detector coil 5 is used for taking over a useful signal, in this case a current flow (bias current 60) is produced through the coil, by means of the d.c. supply 51, in order to achieve the desired bias of the Villary strip 4, as it is evident on the basis of the drawn-in field lines 12.

Additionally, as a shielding against magnetic and electrostatic influences, this detector coil 5, preferably also the entire detector arrangement 105, thus e.g. including the power source 51, can be surrounded as closely as possible by a shielding sleeve 61, having in this case only the openings for the entrance of the Villary strip 4 respectively the waveguide 3 on the one hand, as well as for the inserting of the power connections for the detector coil 5. The shielding sleeve preferably consists of a high permeability material, in particular a so-called Mu-metal with a permeability μ>1000.

FIG. 5b show the way in which the detector coil 5 is surrounded by a flux guiding body 30, from which at the front side only the element penetrating the passage 5a of the detector coil 5, either the Villary strip 4 or the waveguide 3 stands out. Thus a foreign magnetic influence of the detector coil 5 from the outside is reduced, but in particular the magnetic induction inside the coil is increased, so that substantially less magnetizing current is needed.

Additionally a bias of the Villary strip 4 respectively of the waveguide 3 can be achieved by arranging one or more magnets 6, 6', 6'', 6''' inside and/or outside of the flux guiding body 30.

Thus FIG. 5b1 points, for example, with the polarity direction radially to the longitudinal direction of the detector coil 5 inside the rod magnets 6 (or a ring magnet), arranged at the front side within the flux guiding pieces 30, whose polarity of the appropriate magnets at the opposite faces of the coil 5 is opposite to each other, in order to achieve a lateral flux (kidney-shaped field lines 12, as represented in FIG. 5a).

The arrangement of the magnet(s) 6'- 6''' is also possible outside, e.g. on the external front surface of the flux guiding body 30, and/or in appropriate way at the front side on the slot for the conductor connections, as shown in FIG. 5b2, whereby preferably two magnets 6'', 6''' are arranged again with radial pole direction close to the longitudinal ends outside on the lateral surface of the shielding flux guiding pieces 30, with opposite pole direction, while a third magnet 6' is arranged at the external front side, pointing to the central opening for entering of the waveguide 3 respectively of the Villary strip 4, likewise radially polarized. The magnets 6' and 6'' serve primarily the amplifying of the position signal, while the magnet 6''' serves the improvement of the relationship between the useful signal and spurious signals. In all three cases there are preferably permanent magnets, just like with the magnet 6 within the flux guiding pieces 30.

In this context the detector coil 5 is used preferably only to pick up the useful signal in form of a voltage variation, or additionally also for subjecting with bias current.

FIG. 5c shows a solution, with which the detector coil 5 is surrounded also by a flux guiding body 30, from which the Villary strip 4 is led out only, and additionally the terminals for the detector coil 5, which is flowed through in this case additionally by a current, in order to produce the desired bias of the Villary strip 4.

Outside on the flux guiding body 30, which can stand over for this purpose to some extent at the front surfaces radially outward, an additional field coil 24 is applied. The useful signal can be picked up alternatively at the detector coil 5 or at the field coil 24 respectively both signals become supplied to an evaluation circuit.

FIG. 6 shows a physical solution when applying the detector coil 5 on the waveguide 3. Also in this case the coil 5 is as far as possible enclosed by a flux guiding body 30, which is penetrated at the front side in particular only by the waveguide 3, whereby an additional sleeve-shaped bearing element 37 is arranged between the waveguide 3 and the passage opening in the shielding 30. The bearing element 37 should exhibit as small a damping effect as possible in relationship to the mechanical-elastic wave, which runs along the waveguide. Additionally the tubular back conductor 22, surrounding the waveguide 3 as well as its support, e.g. the foam hose 21, is connected electrically conductively with a front plate 39 made of electrically conductible material covering the entire neighboring front surface of the flux guiding body 30.

Further the electrical connections for the detector coil 5 are led outward through the flux guiding body 30.

Also here the detector arrangement 105 can be arranged additionally outside by an as closely as possible enclosing shielding sleeve 61, similarly to the representation and description in FIG. 5a, with which in this case preferably also the passage between the back conductor 22 and the front plate 39 is still inside of this shielding sleeve 61.

The FIG. 7 show longitudinal sections through the detector arrangement 105 surrounded by a flux guiding body 30 with the detector coil 5.

Figure 7A:
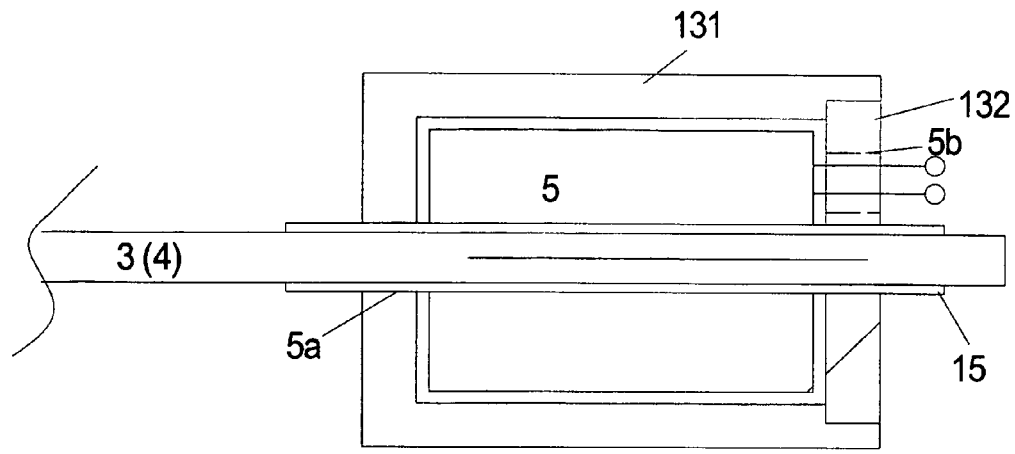
FIGS. 7(a)-(b): sectional views similar to line VII-VII in accordance with FIG. 3,
FIGS: 8(a)-(c): detector arrangements with toroidal coil.

In both variants of the FIGS. 7a, b, the detector coil 5 is penetrated in longitudinal direction by the Villary strip and stands out at both ends from the detector coil 5. In order to avoid a mechanical contact between both components, the Villary strip 4 can be surrounded at least over the entire length not only of the detector coil 5 but also of the flux guiding body 30 by an e.g. hose-shaped bearing element 15 with low mechanical damping.

Opposite to this, the flux guiding body 30 exhibits different configurations in both cases:

In FIG. 7a, the flux guiding body 30 consists of a pot-shaped base part 133 in which an opening 5a is arranged central at the front face to lead through the Villary strip 4 with surrounding hose 15. The opposite open front face is closed by a cover 132, which exhibits eccentrically a conductor opening 5b' for the two conductors to the detector coil 5, besides of a central opening 5a' for the stepping out of the bearing element 15 and the Villary strip 4.

Independently from the design of the flux guiding body 30, the conductor opening 5b can be arranged also in the lateral surface of the flux guiding body.

Figure 7B:
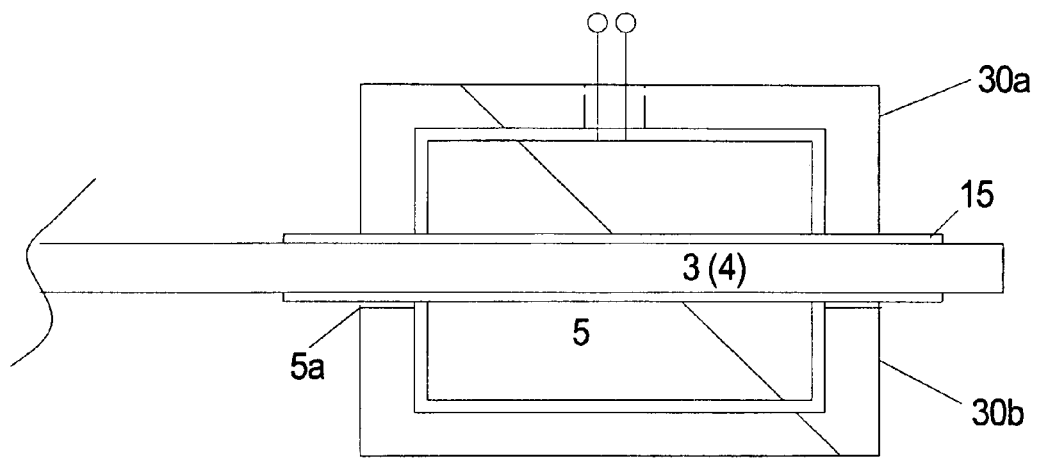

This is the case with the design in accordance with FIG. 7b, in which the cylindrical housing of the flux guiding body 30 consists of two half shells, whose contact surface is the drawing surface of the FIG. 7b, and with which all openings, thus the front side central openings 5a,a', as well as the conductor opening 5b,b', are on this contact plane and are configured preferably as a half in each of the two half shells. In order to be able to use identical parts, therefore the conductor opening 5b is present on two each other opposite positions in the lateral surface.

Figure 8A:
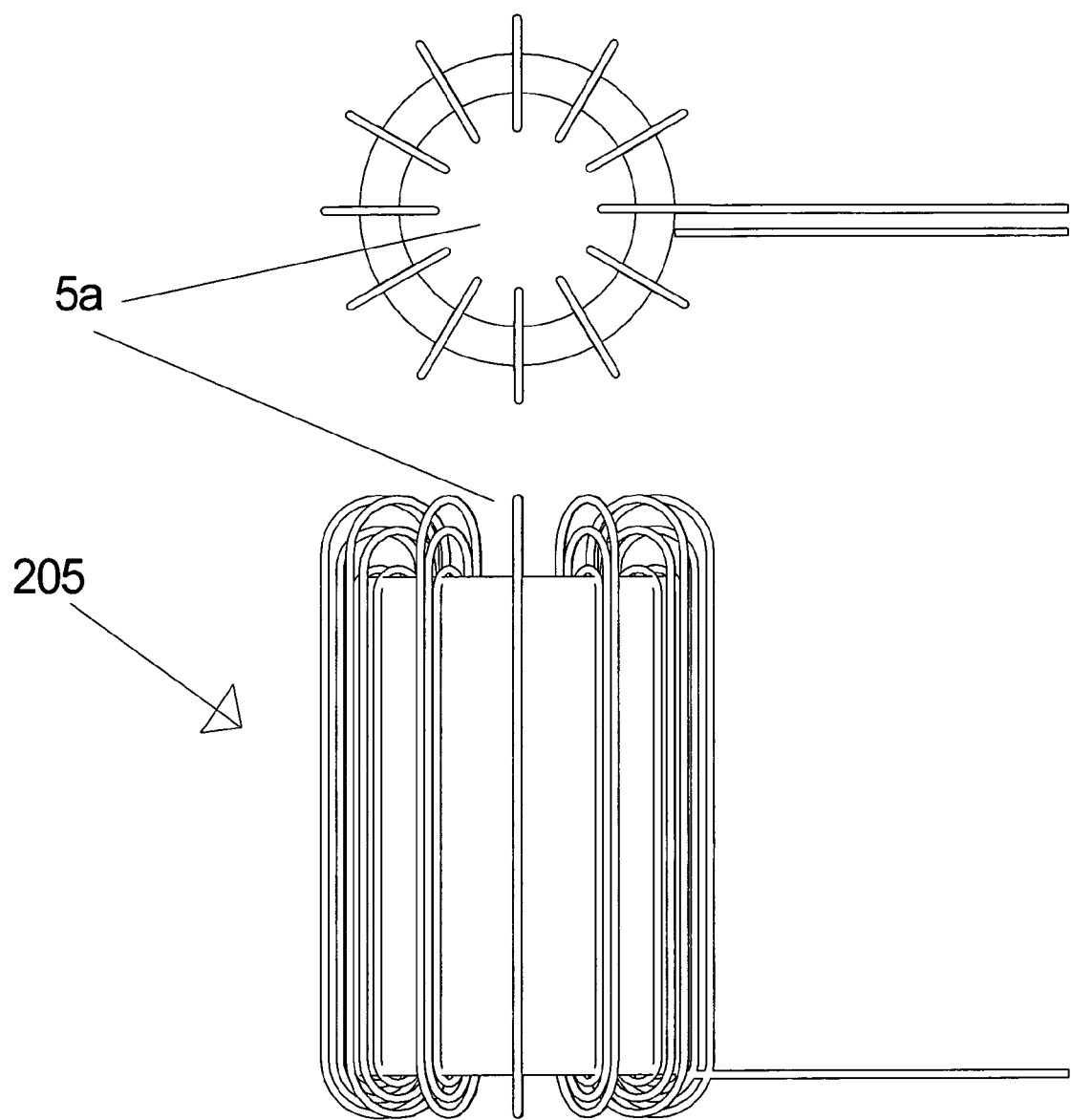
Figure 8B:
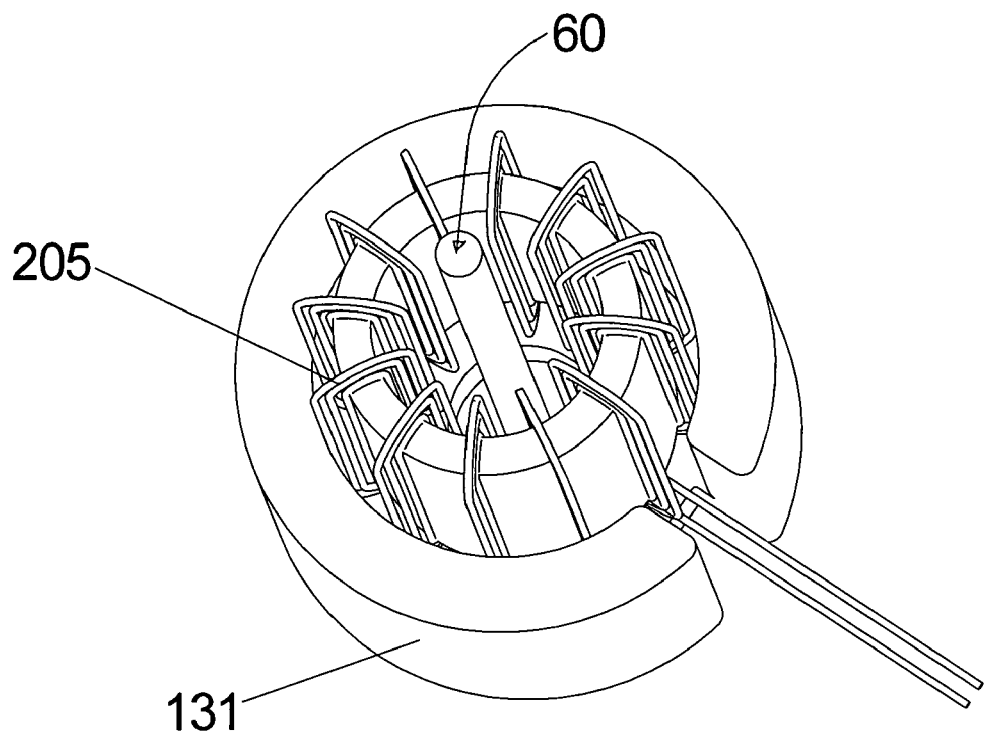

The FIG. 8 show a solution of the detector arrangement 105, where the detector coil exhibits the form of a toroidal coil 205. The remaining construction units of the sensor are not represented in the FIG. 8, however the central passage 5a of the detector arrangement 105 should be penetrated centrally by the magnetoelastic element, thus the waveguide itself or the Villary strip, even with these solutions of the FIG. 8.

FIG. 8a shows the toroidal coil 205 individually, wound on a toroid-shaped coil core.

Figure 8C:
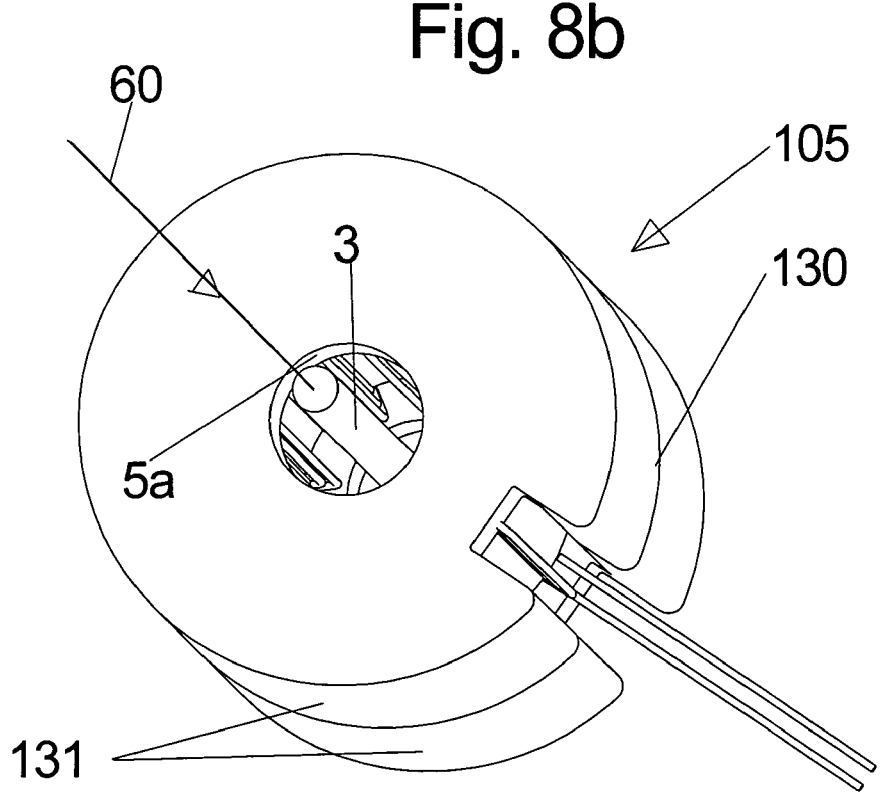

The toroidal coil 205 is surrounded in accordance with FIG. 8c by a flux guiding body 130, which likewise exhibits a passage 5a at its faces, encloses also the toroidal coil 205 and leaves only small exit openings for the electrical connections of the coil. The flux guide 130 consists of two preferably identical half shells 131, which are set opposite to each other with their open sides and accommodate inside the toroidal coil 205, that is why the half shells 131 preferably also possess a round cross section, and are closed on a face except the passage opening 105.

The FIG. 9 show detector arrangements 105, which scan the waveguide directly, and not a Villary strip arranged at the waveguide.

Preferably with these solutions of the FIG. 9, a direct current charging of the detector coil 5 is abandoned, as well as to a magnet arranged close to the detector coil as bias magnet.

The remanence with circular polarization, remaining in the waveguide, which became excited by the original current impulse, works as biasing.

Instead of that, the detector coil 5 of the detector arrangement 105, either enclosing the waveguide 3 or arranged beside it, is arranged at such a position of the waveguide in which the mechanical-elastic wave running along the waveguide overlays with a running-back wave, reflected at a reflector 56 at the end of the waveguide, in such a way that the amplitude is amplified. A block with high specific weight, thus preferably made of a metal, is used as reflector 56 for this purpose.

Figure 9A:
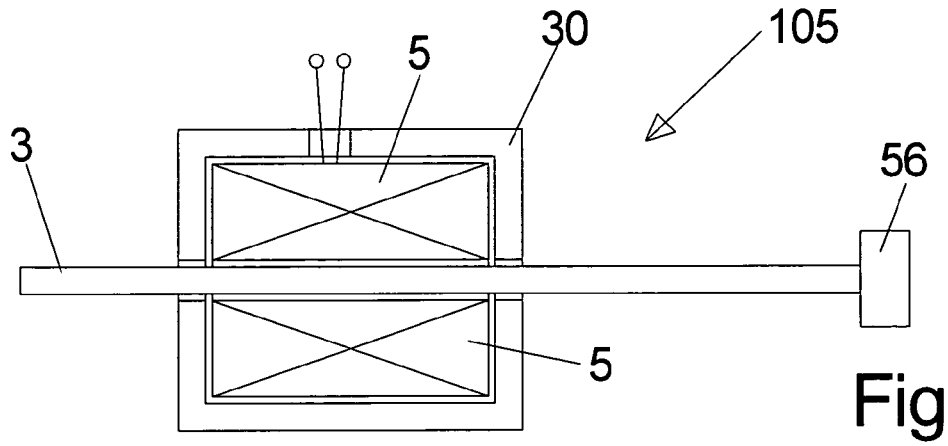
FIGS. 9(a)-(g): further detector arrangements, and
FIGS: 10a, 10b: additional detector arrangements.
Figure 9B:
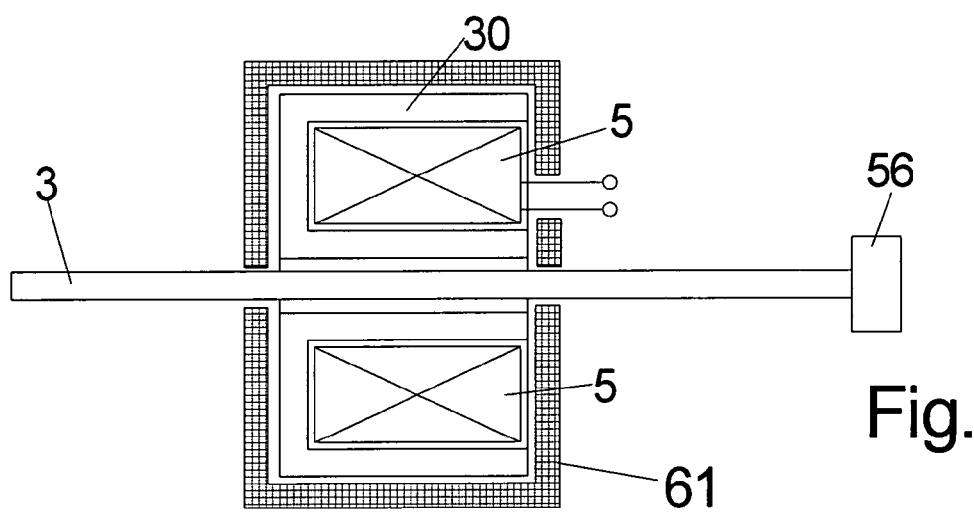

The FIGS. 9a and 9b show thereby a detector coil 5 penetrated by the waveguide, whose passage opening is so large that, no contact between detector coil 5 and waveguide 3 is present. The detector coil 5 is encased again by a flux guiding body 30 with then approximately cylindrical outer circumference, which at the front side likewise possesses ingoing and outgoing openings for the waveguide 3, which should not contact the waveguide 3, but should keep a sufficient distance to it.

In an opposite way, in FIG. 9b the detector coil 5 is enclosed by a pot-shaped flux guiding body 30, which accordingly does not cover the detector coil 5 on a front face. An additional ring wall of the flux guiding body 30 is arranged coaxially around the waveguide 3 and spaced away from it between the detector coil 5 and the waveguide 3.

Figure 9C:
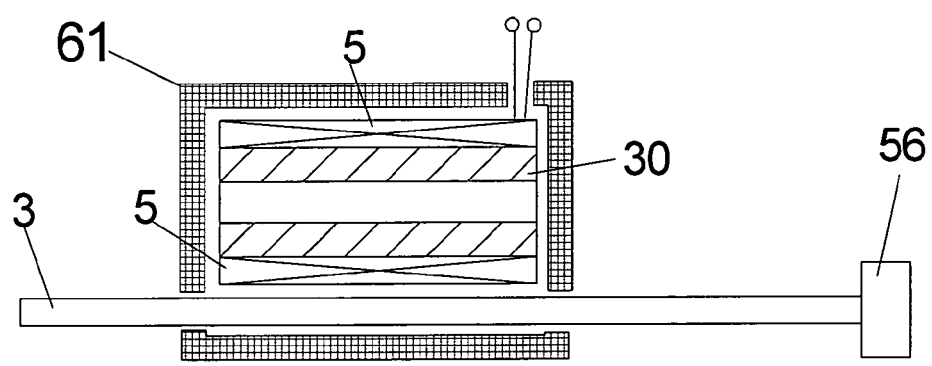

FIGS. 9c-9g concern one or more detector coils 5 not surrounding the waveguide 3, but arranged beside it:

In FIG. 9c an e. g. sleeve shaped flux guiding body 30 is arranged coaxially in the inside cavity of the coil 5. The same applies to FIG. 9d, however here the detector coil 5 stands with its longitudinal axis perpendicularly to the measuring direction 10, which is the extending direction of the waveguide 3, at a small distance from it, without contacting it. The same applies to the flux guiding body 30.

Figure 9D:
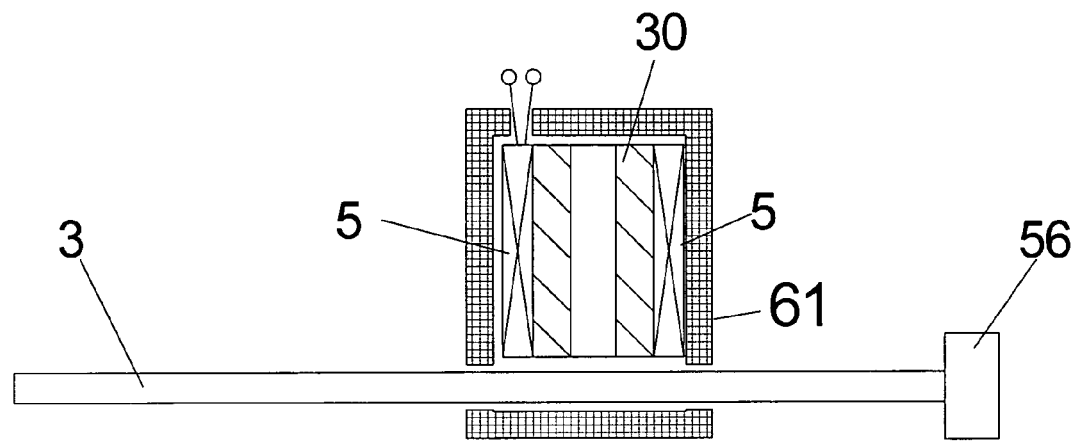
Figure 9E:
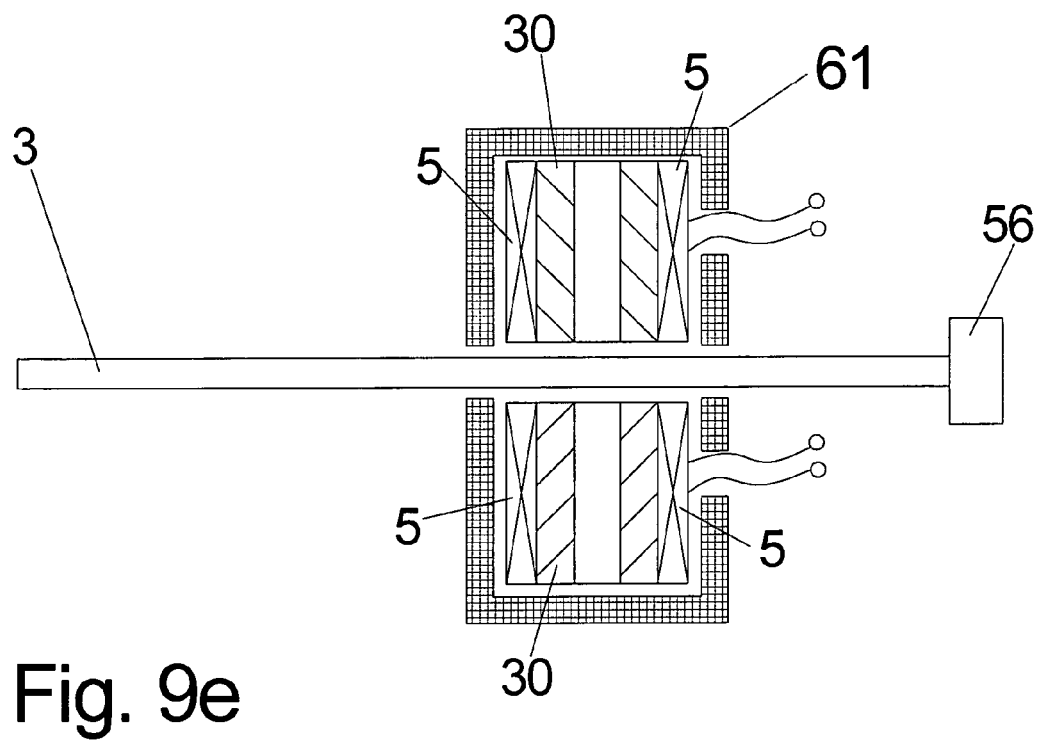

FIG. 9e shows a doubled arrangement opposite to FIG. 9d, thus two each other detector coils 5 diametrically opposite in relationship to the waveguide 3 with assigned flux-guiding bodies 30.

Figure 9F:
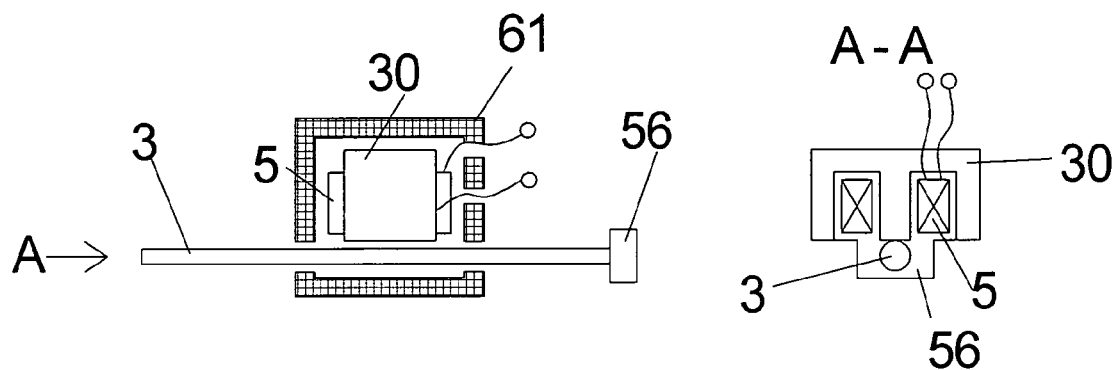
Figure 9G:
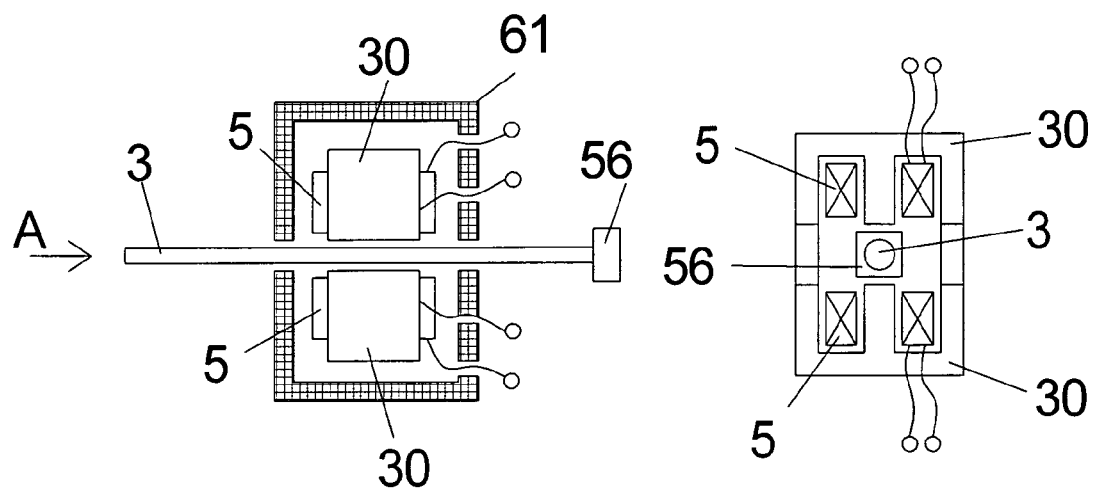

In FIG. 9f—on adjustment of the coil axis of the detector coil 5 perpendicularly to the waveguide 3—this detector coil 5 is located on an E-shaped flux guiding body 30, i.e. on its central freely ending leg, so that the outside freely ending legs run as close as possible along the outer circumference of the detector coil 5 and the connecting transverse leg is arranged on the side of the detector coil 5 turned away from the waveguide 3.

FIG. 9g shows again a doubled arrangement in contrast thereto with two such units made of detector coil 5 and flux guiding body 30, mirroring each other concerning the waveguide 3, whereby additionally the gap between the two free ends of the each other facing legs of the two flux guiding bodies 30 can be filled by a closing body, whereby the closing body can be in particular likewise a flux guiding body 30 with the material properties defined before.

Also here again, in particular with the solutions in accordance with the FIGS. 9b-9g, with which no tight enclosing is given to the detector coil by the flux guiding pieces 30, the detector coil including the flux guiding pieces, in particular the entire respective detector arrangement 105, may be arranged by an additional shielding case 61, similarly to the representation and description in the FIG. 5a, for an additional magnetic and electrostatic shielding.

Figure 10A:
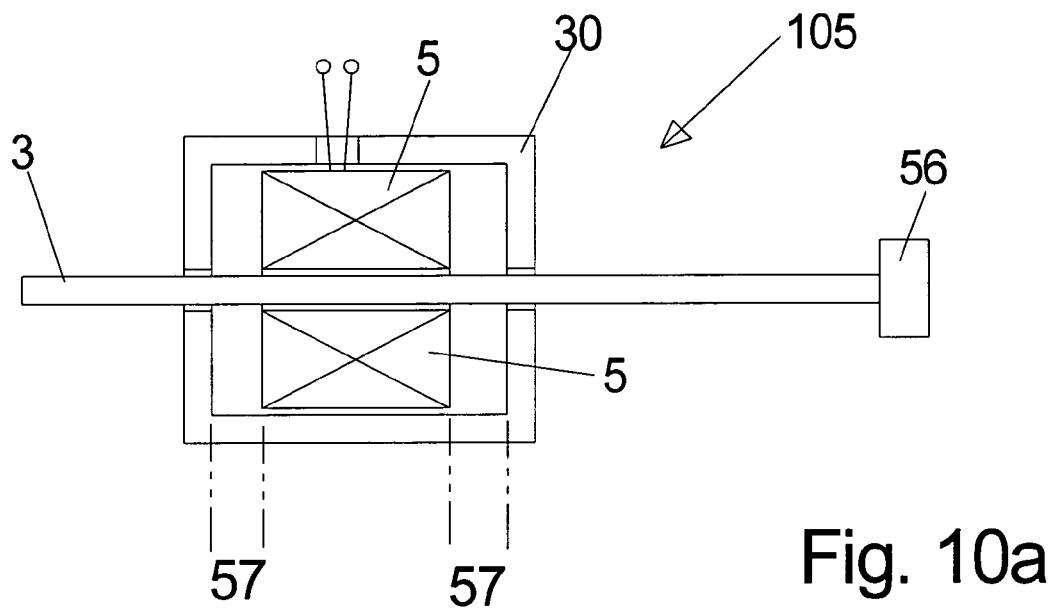
Figure 10B:
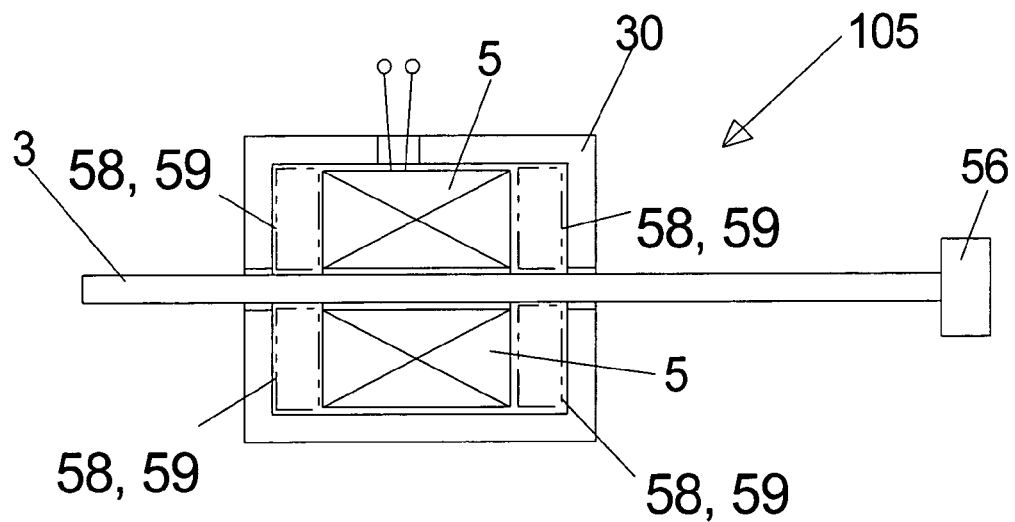

The FIGS. 10a, 10b show further a solution similar to FIG. 9a, however with the difference that a distance 57 (air gap) is present in the case of the FIG. 10a between the detector coil 5 and the surrounding flux guiding pieces at the front side, i. e. in axial direction, while in the case of the FIG. 10b a remanence body 58 is present between the front surfaces of the detector coil 5 and the internal front surfaces of the flux guiding pieces 30, in particular surrounding the waveguide 3 in a ring-shaped way.

While the invention has been described with a certain degree of particularly, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

LIST OF REFERENCES 1 supporting body
2 head plate
3 waveguide
4 Villary strip
4a, b partial strip
105 detector arrangement
205 toroidal coil
5 detector coil
5' compensation coil
5a opening
6, 6', 6", 6'" magnet
7 closing flap
9 extension
10 measuring direction
11 recess
12 field lines
13 damping element
14 adhesive
15 bearing element
16 bridge completing impedance
17 amplifier
20 protection profile
21 foam hose
22 back conductor
23 uncoupling coil
24 field coil
25 coupling impedance
26 uncoupling impedance
27 back conductor
28 position magnet
29 useful signal
30, 130 flux guiding body
131 half shell
31 constant current diode
32 voltage source
132 cover
33 quadrator
133 base part
37 sleeve shaped bearing element
50 detector circuit
51 power source
55 compensation magnet
56 reflector
57 distance
58 remanence body
59 permanent magnet
60 bias current
61 shielding

The invention claimed is:

1. A position sensor according to the runtime principle of a mechanical-elastic wave, said sensor comprising:
   a waveguide;
   a position element movable along the waveguide;
   a detector arrangement arranged on the waveguide including a detector coil; and
   a power source being connected to the detector coil, so that the detector coil may be biased with a direct current.

2. The sensor according to claim 1 wherein said power source is adjustable.

3. The position sensor according to claim 1 wherein said sensor includes at least one compensation magnet assigned to the waveguide in the proximity of the detector arrangement.

4. The position sensor according to claim 3 wherein said compensation magnet is positioned between the measuring range of said waveguide and said detector arrangement.

5. The position sensor according to claim 3 wherein said compensation magnet is arranged with a flux direction parallel to an extending direction of said waveguide.

6. A position sensor according to the runtime principle of a mechanical-elastic wave, said sensor comprising:
   a waveguide;
   a position element movable along the waveguide; and
   a detector arrangement arranged on the wave guide and having a detector coil and having at least one flux guiding body assigned to and surrounding the detector coil forming a closed magnetic circle through the coil to shield the coil against external magnetic fields and/or the magnetic field of the wave guide itself and to guide magnetic flux into the coil thus concentrating magnetic flux within the coil to increase the amplitude of a signal to be detected by the detector arrangement.

7. The position sensor according to claim 6 wherein said at least one flux guiding body consists of a ferromagnetic material with a permeability of 1.

8. The position sensor according to claim 6 wherein said at least one flux guiding body is made of ferrite.

9. The position sensor according to claim 6 wherein said sensor includes at least one compensation magnet assigned to the waveguide in the proximity of the detector arrangement.

10. The position sensor according to claim 9 wherein said compensation magnetic is positioned between the measuring range of said waveguide and said detector arrangement.

11. The position sensor according to claim 9 wherein said compensation magnet is arranged with a flux direction parallel to an extending direction of said waveguide.

* * * * *

UNITED STATES PATENT AND TRADEMARK OFFICE
CERTIFICATE OF CORRECTION

Page 1 of 1

PATENT NO.       : 7,808,231 B2
APPLICATION NO.  : 11/047430
DATED            : October 5, 2010
INVENTOR(S)      : Klaus Manfred Steinich and Liu Jigou It is certified that error appears in the above-identified patent and that said Letters Patent is hereby corrected as shown below:

Col. 12, claim 7 should read -- The position sensor according to claim 6 wherein said at least one flux guiding body consists of a ferromagnetic material with a permeability of $\gg 1$ --

Signed and Sealed this
Twenty-eighth Day of June, 2011

David J. Kappos
*Director of the United States Patent and Trademark Office*

UNITED STATES PATENT AND TRADEMARK OFFICE
CERTIFICATE OF CORRECTION

PATENT NO. : 7,808,231 B2
APPLICATION NO. : 11/047430
DATED : October 5, 2010
INVENTOR(S) : Klaus Manfred Steinich and Liu Jigou It is certified that error appears in the above-identified patent and that said Letters Patent is hereby corrected as shown below:

Col. 12, lines 39-41, claim 7 should read -- The position sensor according to claim 6 wherein said at least one flux guiding body consists of a ferromagnetic material with a permeability of $\gg 1$ --

This certificate supersedes the Certificate of Correction issued June 28, 2011.

Signed and Sealed this
Twenty-sixth Day of July, 2011

David J. Kappos
*Director of the United States Patent and Trademark Office*